United States Patent
Suzuki

(10) Patent No.: US 12,332,542 B2
(45) Date of Patent: Jun. 17, 2025

(54) IMAGING DEVICE

(71) Applicant: NIDEC PRECISION CORPORATION, Tokyo (JP)

(72) Inventor: Yuusuke Suzuki, Tokyo (JP)

(73) Assignee: NIDEC PRECISION CORPORATION, Tokyo (JP)

( * ) Notice: Subject to any disclaimer, the term of this patent is extended or adjusted under 35 U.S.C. 154(b) by 0 days.

(21) Appl. No.: 18/464,264

(22) Filed: Sep. 11, 2023

(65) Prior Publication Data
US 2024/0094606 A1  Mar. 21, 2024

(30) Foreign Application Priority Data

Sep. 16, 2022 (JP) .................................. 2022-148217
May 18, 2023 (JP) .................................. 2023-082261

(51) Int. Cl.
*G03B 11/04* (2021.01)

(52) U.S. Cl.
CPC .................................. *G03B 11/045* (2013.01)

(58) Field of Classification Search
CPC ... G03B 11/045; G03B 11/041; G03B 11/043; G03B 9/36; G03B 9/04
See application file for complete search history.

(56) References Cited

U.S. PATENT DOCUMENTS

| | | | | |
|---|---|---|---|---|
| 6,027,261 | A * | 2/2000 | Naganuma | G03B 9/04 396/508 |
| 6,099,172 | A * | 8/2000 | Togashi | G03B 9/04 396/505 |
| 6,424,803 | B1 | 7/2002 | Mikami et al. | |
| 6,574,431 | B2 | 6/2003 | Mikami et al. | |
| 7,079,185 | B2 | 7/2006 | Koyama et al. | |
| 7,542,089 | B2 | 6/2009 | Koyama et al. | |
| 9,063,394 | B2 | 6/2015 | Umehara | |
| 11,226,466 | B2 | 1/2022 | Wang et al. | |
| 2019/0258137 | A1 * | 8/2019 | VanTassell | G03B 9/38 |
| 2020/0201143 | A1 * | 6/2020 | Imai | G03B 11/043 |
| 2020/0249415 | A1 | 8/2020 | Wang et al. | |
| 2021/0033947 | A1 * | 2/2021 | Ushio | G03B 11/043 |
| 2021/0215997 | A1 * | 7/2021 | Güzel | G03B 17/56 |
| 2022/0171258 | A1 * | 6/2022 | Chang | H04N 23/55 |

FOREIGN PATENT DOCUMENTS

| | | |
|---|---|---|
| JP | H11311821 A | 11/1999 |
| JP | H11338008 A | 12/1999 |
| JP | 2000162670 A | 6/2000 |
| JP | 2010177869 A | 8/2010 |
| JP | 2015102823 A | 6/2015 |
| JP | 2020005008 A | 1/2020 |

* cited by examiner

*Primary Examiner* — Christopher E Mahoney
(74) *Attorney, Agent, or Firm* — HAUPTMAN HAM, LLP

(57) ABSTRACT

An imaging device includes an imaging element that receives subject light, a lens that guides the subject light traveling through a first opening in a housing to the imaging element, a blade between the first opening and the lens to restrict the subject light from entering the imaging element, and an actuator that moves the blade in a first direction intersecting with an optical axis of the lens to position the blade at one of a first position at which the subject light is restricted from entering the image element or a second position at which the subject light is allowed to enter the imaging element. The blade is curved along a curved profile of the lens in a second direction intersecting with the optical axis and with the first direction.

14 Claims, 8 Drawing Sheets

IMAGING DEVICE

RELATED APPLICATIONS

The present application claims priority to Japanese Application Numbers 2022-148217, filed Sep. 16, 2022, and 2023-082261, filed May 18, 2023, the disclosure of which applications are hereby incorporated by reference herein in their entirety.

BACKGROUND

Technical Field

The present invention relates to an imaging device.

Description of the Background

Surveillance cameras are installed at various places such as nursing care facilities, hospitals, factories, and stores for crime and disaster prevention. Such surveillance cameras, which are imaging devices, are to be operated with privacy protection of individuals as subjects to be photographed. For privacy protection, a surveillance camera includes a light shield that covers a lens as appropriate.

Patent Literature 1 describes an assembly that is movable relative to a stationary member that is an imager to function as a shutter.

CITATION LIST

Patent Literature

Patent Literature 1: U.S. Patent Application Publication No. 2020/0249415

BRIEF SUMMARY

However, the imaging device cannot be smaller depending on the shape of the shutter or the arrangement of the assembly for driving the shutter.

An imaging device according to an aspect of the present invention includes an imaging element that receives subject light, an optical member that guides the subject light traveling through a first opening in a housing to the imaging element, a light shield between the first opening and the optical member to restrict the subject light from entering the imaging element, and a drive that moves the light shield in a first direction intersecting with an optical axis of the optical member to position the light shield at one of a first position at which the subject light is restricted from entering the image element or a second position at which the subject light is allowed to enter the imaging element. The light shield is curved along a curved profile of the optical member in a second direction intersecting with the optical axis and with the first direction.

An imaging device according to another aspect of the present invention includes an imaging element that receives subject light, an optical member that guides the subject light traveling through a first opening in a housing to the imaging element, a light shield between the first opening and the optical member to restrict the subject light from entering the imaging element, a drive that moves the light shield in a first direction intersecting with an optical axis of the optical member to position the light shield at one of a first position at which the subject light is restricted from entering the image element or a second position at which the subject light is allowed to enter the imaging element, and an auxiliary opening that allows the subject light to travel through when the light shield is at the first position.

The imaging device according to the above aspects of the present invention can be smaller.

DETAILED DESCRIPTION

An imaging device according to one or more embodiments of the present invention will now be described in detail with reference to the drawings.

The imaging device according to the present embodiment may be used for any purpose and may be installed at, for example, a hospital, a nursing care facility, a factory, and a store as a surveillance camera or a monitoring camera. The imaging device is switchable between an imaging state and an imaging-disabled state. More specifically, the imaging device can switch between a closed state in which light cannot enter an imaging optical system and an open state in which light can enter the imaging optical system. Once the imaging device switches to the imaging-disabled state (closed state), a person being imaged can recognize that the imaging device has been switched to the imaging-disabled state. The imaging device is switchable between a normal imaging mode and a low-light imaging mode based on the brightness level in the external environment surrounding the imaging device. Imaging in the normal imaging mode is performed using light incident on the imaging optical system when the external environment is bright. Imaging in the low-light imaging mode is performed using illumination light emitted when the external environment is dark to allow imaging of a subject using the illumination light.

First Embodiment

Figure 1A:
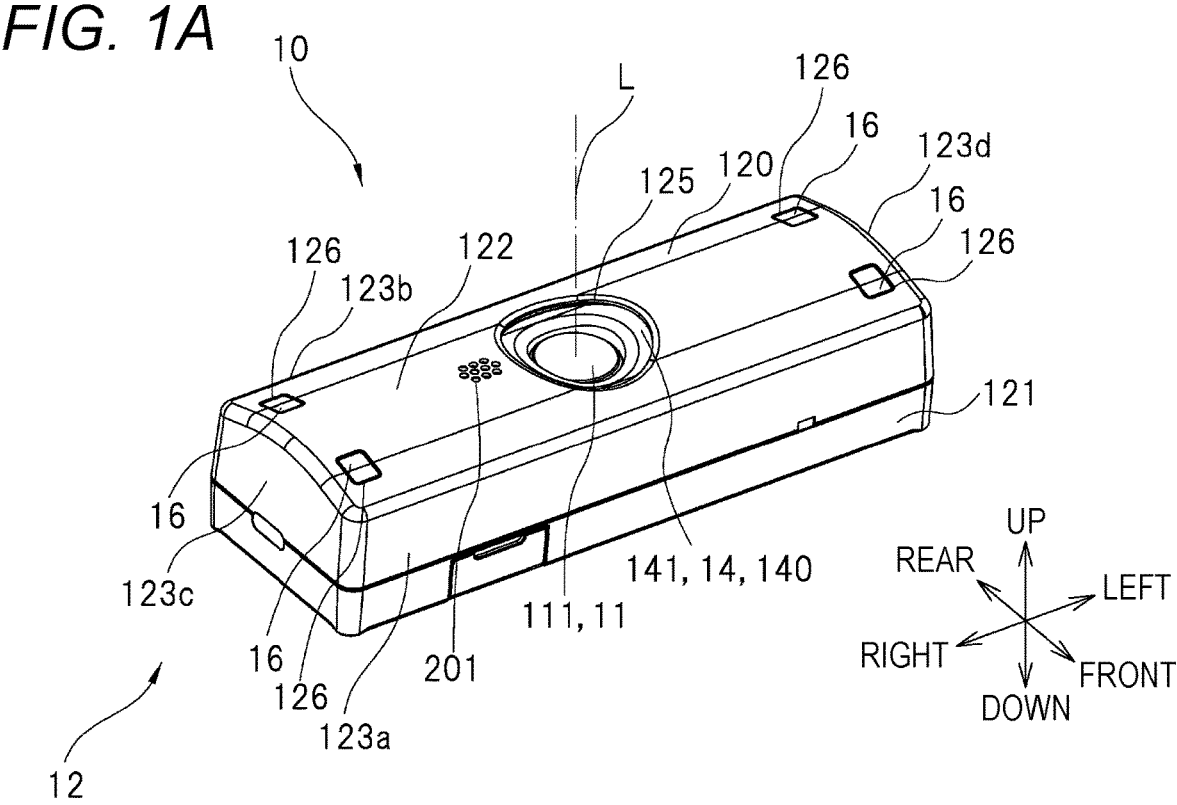
FIG. 1A is an external view of an imaging device according to a first embodiment in an open state.
Figure 1B:
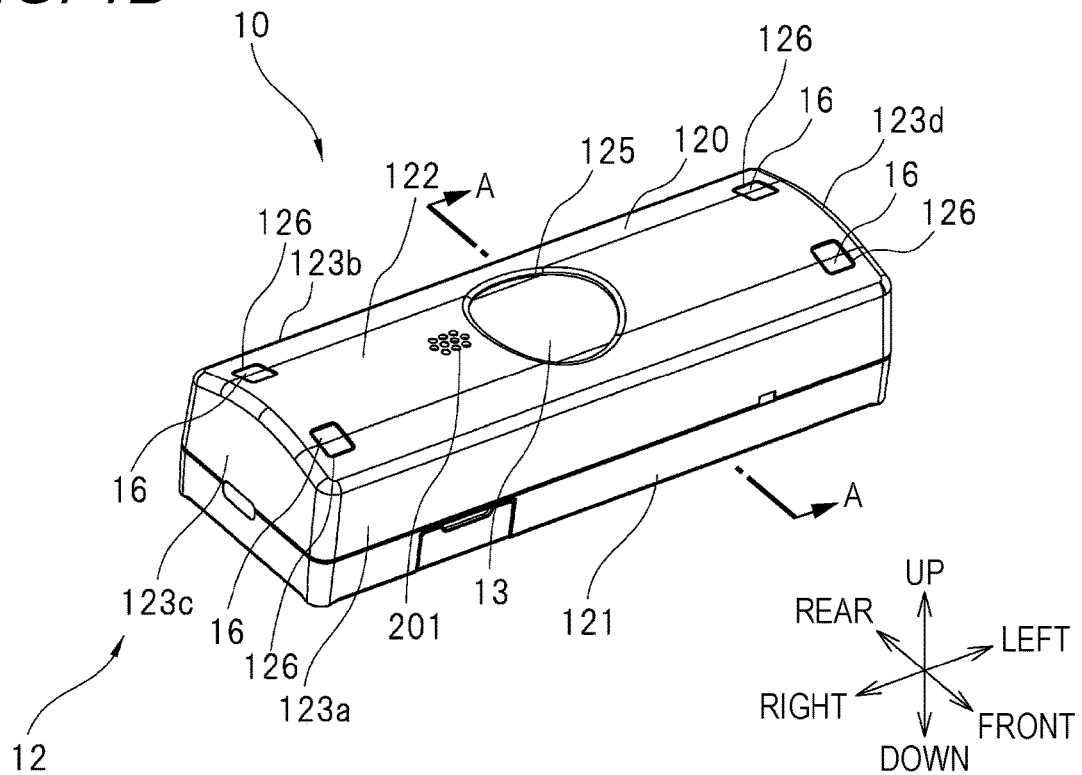
FIG. 1B is an external view of the imaging device in a closed state.
Figure 2:
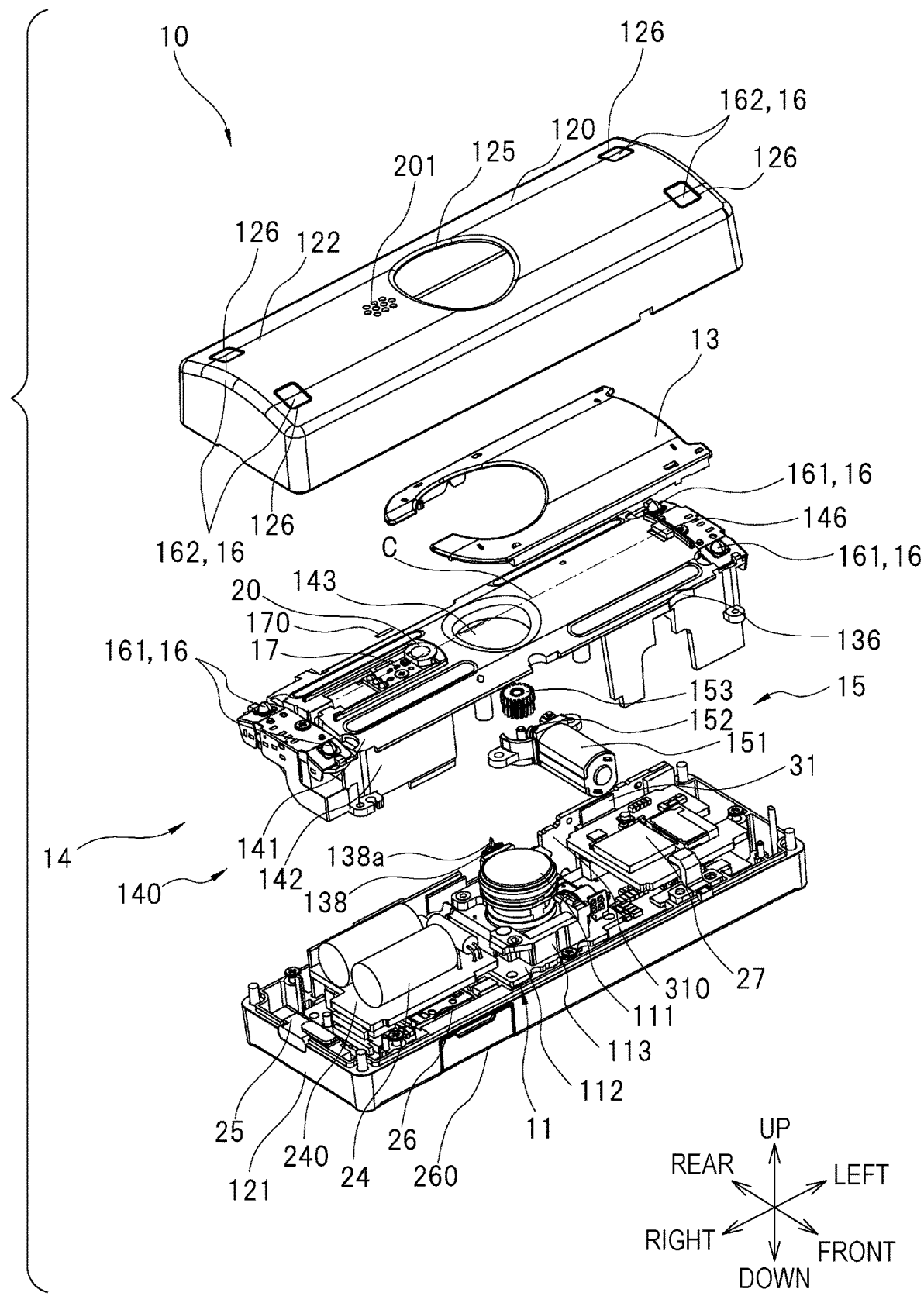
FIG. 2 is an exploded perspective view of the imaging device in the open state.

FIGS. 1A and 1B are each an external view of an imaging device 10 according to a first embodiment. FIG. 1A shows the imaging device 10 in an open state. FIG. 1B shows the imaging device 10 in a closed state. FIG. 2 is an exploded perspective view of the imaging device 10 in the open state shown in FIG. 1A.

Overall Structure of Imaging Device 10

The imaging device 10 is switchable from the open state (FIG. 1A) to the closed state (FIG. 1i). The imaging device 10 is switchable from the closed state (FIG. 1B) to the open state (FIG. 1A). As shown in FIGS. 1A to 2, the imaging device 10 includes a camera module 11, a housing (outer case) 12, a blade 13, a blade driver 14, illuminators 16, an illuminometer 17, a connector 25, a memory slot 26, an antenna 27, and a controller 31.

Housing 12

The housing 12 includes a front case 120 and a rear case 121. The front case 120 includes a rectangular or substantially rectangular top plate 122 and side wall plates 123a, 123b, 123c, and 123d that adjoin the sides of the top plate 122. The top plate 122 and the side wall plates 123a, 123b, 123c, and 123d are integrally formed from a synthetic resin. The side wall plate 123a adjoins one long side of the top plate 122. The side wall plate 123b adjoins the other long side of the top plate 122. The side wall plate 123c adjoins one short side of the top plate 122. The side wall plate 123d adjoins the other short side of the top plate 122.

Hereafter, the direction in which the front case 120 of the housing 12 is located may be referred to as being upward, the direction in which the rear case 121 is located as being downward, the direction in which the sidewall plate 123a is located as being frontward, the direction in which the sidewall plate 123b is located as being rearward, the direction in which the sidewall plate 123c is located as being rightward, and the direction in which the sidewall plate 123d is located as being leftward. The right-left direction may be referred to as a first direction. The front-rear direction may be referred to as a second direction. The first direction intersects with an optical axis L of a lens 111 in the camera module 11 (described later). The second direction intersects with the first direction and the optical axis L.

The top plate 122 of the front case 120 has a circular first opening 125 connecting the inside and the outside of the housing 12. In other words, the first opening 125 is a through-hole in the top plate 122. Light (subject light) emitted from an imaging target (subject) travels through the first opening 125 into the housing 12 and enters the imaging optical system.

The top plate 122 of the front case 120 has illumination openings 126 at positions corresponding to the positions of the illuminators 16 (described later). In other words, the illumination openings 126 are also through-holes in the top plate 122. Illumination light emitted from the illuminators 16 travels through the illumination openings 126 to illuminate the imaging target (subject).

As shown in FIGS. 1A to 2, the top plate 122 has four illumination openings 126 in total, with two in its right portion (one at the front and the other at the rear) and the other two in its left portion (one at the front and the other at the rear). The positions of the illumination openings 126 are not limited to the positions shown in the figure and are determined based on the arrangement of the illuminators 16. The illumination openings 126 may not be four illumination openings, but may be three or fewer or five or more illumination openings. The number of illumination openings 126 is determined based on the number of illuminators 16 in the imaging device 10.

The rear case 121 is fastened to the front case 120 and closes the bottom (downward) of the front case 120. The rear case 121 is fastened to the front case 120 with, for example, screws.

Connector 25

As shown in FIG. 2, the imaging device 10 includes a connector 25 connectable to, for example, a power cable or a communication cable. More specifically, the imaging device 10 includes a female connector 25 that can receive a universal serial bus (USB) cable. The connector 25 faces an opening in the right side wall plate of the rear case 121 or an opening in the lower surface of the rear case 121. The connector 25 is electrically connected to a substrate 240 including a power supply 24.

Memory Slot 26

The imaging device 10 includes the memory slot 26 connectable to a predetermined storage medium. More specifically, the imaging device 10 includes a slot in which a secure digital (SD) memory card is removably placed. The SD memory card can be placed into or removed from the memory slot 26 after a lid 260 in the rear case 121 is lifted.

Camera Module 11

Figure 3:
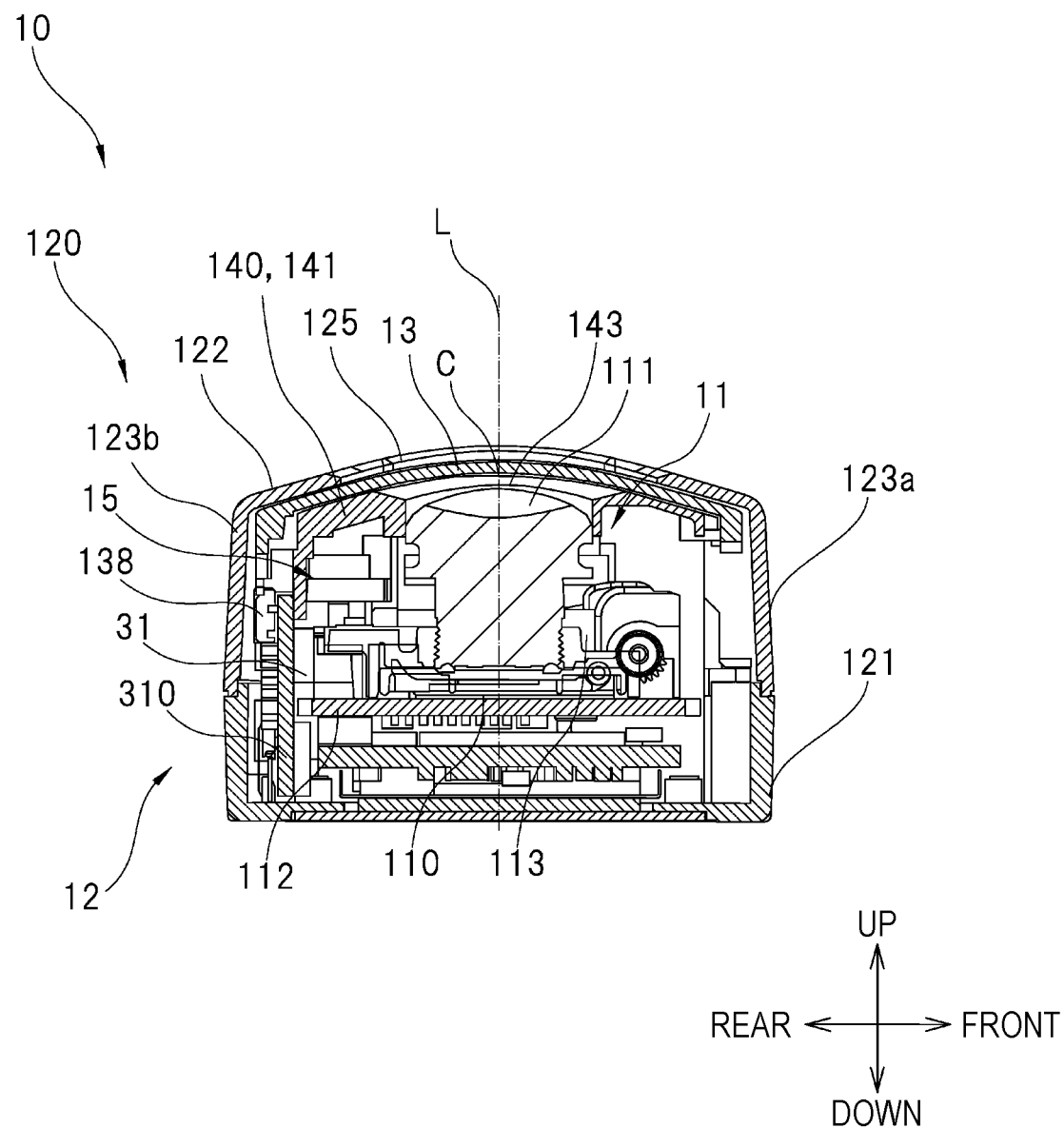
FIG. 3 is a cross-sectional view of the imaging device taken along line A-A in FIG. 1B.

FIG. 3 is a cross-sectional view of the imaging device 10 in the closed state shown in FIG. 1B taken along line A-A. The camera module 11 includes an imaging element (image sensor) 110, such as a complementary metal-oxide-semiconductor (CMOS) or a charge-coupled device (CCD), and the lens 111. The imaging element 110 is mounted on a substrate 112. The lens 111 is, for example, a convex lens, and has a predetermined curvature with its middle portion (an area nearby the optical axis L) protruding toward the imaging target (subject). The lens 111 is located above the imaging element 110 and held by a lens holder 113. Below the lens holder 113, the substrate 112 on which the imaging element 110 is mounted is fastened with, for example, screws.

The lens 111 guides and collects subject light entering the first opening 125 to a light-receiving surface of the imaging element 110. In other words, the lens 111 is an optical member (imaging optical system) that forms an image of the imaging target on the light-receiving surface of the imaging element 110, or at least a part of the optical member. The imaging element 110 converts the brightness of light for the image formed by the lens 111 into electric charge and outputs a signal (image signal) corresponding to the resultant electric charge.

Antenna 27

Referring back to FIG. 2, the imaging device 10 includes the antenna 27, and can be interconnected with other devices through a wireless local area network (LAN), or Wi-Fi. For example, the imaging device 10 can wirelessly transmit signals (image signals) output from the imaging element 110 to other devices such as smartphones and tablet terminals. The imaging device 10 can be remotely controlled with another device such as a smartphone.

Illuminators 16

The illuminators 16 emit illumination light to illuminate the imaging target for imaging in a dark surrounding environment (or in the low-light imaging mode). Each illuminator 16 includes an illumination light source 161 and a cover 162. The illumination light source 161 is, for example, a light-emitting diode (LED) that emits light with a wavelength in the infrared region (infrared rays or infrared light) under control of the controller 31 (described later). The illumination light source 161 may not emit infrared light as illumination light, and may emit visible light other than infrared light as illumination light. The illumination light source 161 is located on a base 140 included in the blade driver 14 (described later).

The covers 162 are formed from, for example, a light-transmissive resin, and are each located adjacent to an illumination light emission portion of (upward from) the illumination light source 161. Each cover 162 has a surface covering at least an upper portion of the corresponding illumination light source 161. The surface of the cover 162 is fitted into the corresponding illumination opening 126. In this case, each cover 162 is attached without its surface protruding outward from (or above) the outer surface of the top plate 122 of the housing 12. Illumination light emitted from the illumination light sources 161 is output from the imaging device 10 through the surfaces of the covers 162.

As shown in FIGS. 1A to 2, the imaging device 10 includes four illuminators 16. Of the four illuminators 16, a pair of illuminators 16 are located in the right portion of the top plate 122, with one illuminator 16 located at the front and the other illuminator 16 at the rear. The other pair of illuminators 16 are located in the left portion of the top plate 122, with one illuminator 16 located at the front and the other illuminator 16 at the rear.

The imaging device 10 may not include four illuminators 16. The imaging device 10 may include three or fewer illuminators 16 or five or more illuminators 16.

Illuminometer 17

The illuminometer 17, which is, for example, a photoresistor or a photodiode, receives light from the surrounding environment (external environment) of the imaging device 10. The illuminometer 17 is located on the base 140 in the blade driver 14 described in detail later. The illuminometer 17 converts the brightness of received light into electric charge and outputs a signal (luminance signal) corresponding to the resultant electric charge. In other words, the illuminometer 17 functions as a detector to detect the brightness of the environment surrounding the imaging device 10.

Controller 31

The controller 31 is located at the rear in the housing 12, and is mounted on a substrate 310. The controller 31 includes, for example, a central processing unit (CPU), a memory, and other components, and is electrically connected to the substrate 112 on which the imaging element 110 is mounted. The controller 31 is a processor that may read and execute a control program prestored in a storage medium, such as a flash memory, to control various components of the imaging device 10. For example, the controller 31 controls electric power supply from the power supply 24 to the imaging element 110 or an actuator 15.

Blade 13 and Blade Driver 14

The blade driver 14 includes the base 140 and the actuator 15. The blade driver 14 moves the blade 13 in a direction parallel to a long side of the top plate 122 (first direction) to open and close the first opening 125, and controls subject light that enters the lens 111. More specifically, the blade driver 14 moves the blade 13 between a closed position (first position) at which the first opening 125 is closed and an open position (second position) at which the first opening 125 is open. In other words, the blade 13 moved by the blade driver 14 in the first direction is located either the first position at which subject light is restricted from entering the imaging element 110 or the second position at which the subject light is allowed to enter the imaging element 110. The blade 13 at the first position covers the first opening 125 to function as a light shield for restricting subject light from entering the imaging element 110.

In other words, the blade driver 14 switches the first opening 125 in the imaging device 10 from the open state (FIG. 1A) to the closed state (FIG. 1). The blade driver 14 switches the first opening 125 in the imaging device 10 from the closed state (FIG. 1B) to the open state (FIG. 1A). Thus, the lens 111 is covered in the closed state (FIG. 1B) and is exposed in the open state (FIG. 1A).

Base 140

The base 140 is formed from, for example, a synthetic resin, and includes a main base 141 and a subbase 142 integral with each other. The main base 141 is located adjacent to the top plate 122 of the housing 12 with respect to (upward from) the lens 111. The subbase 142 extends downward from the main base 141, and has a threaded hole for fastening the subbase 142 to the rear case 121 with a screw. The subbase 142 is fastened to the rear case 121 with the screw. This fastens the base 140 to the rear case 121. The base 140 with the above structure allows the imaging element 110 to be downward from the main base 141 (adjacent to the rear case 121).

The main base 141 is curved along the curvature of the lens 111 described above in the front-rear direction (second direction). More specifically, the main base 141 protrudes most outward (upward) at a center position C, which is on a line passing through a middle portion of the main base 141 (or a position through which the optical axis L of the lens 111 extends) and extending parallel to the first direction. More specifically, the main base 141 is curved, in the second direction, along or substantially along the curved profile of the lens 111 (refer to FIG. 3).

The main base 141 has a circular opening 143 vertically extending through the base 140 with the optical axis L of the lens 111 at the center. In other words, the opening 143 is a through-hole in the main base 141. Light (subject light) emitted from the imaging target (subject) travels through the first opening 125 in the housing 12 and enters the lens 111 through the opening 143. The opening 143 has an outer diameter larger than the outer diameter of the lens 111 and smaller than the outer diameter of the first opening 125 in the front case 120.

The main base 141 receives at least the blade 13, the actuator 15, the illuminators 16, and the illuminometer 17. The blade 13, the illuminators 16, and the illuminometer 17 are mounted on the upper surface of the main base 141. In other words, the base 140 functions as a support supporting the blade 13 with the main base 141 from below (or in other words, adjacent to the imaging element 110).

The main base 141 receives two illuminators 16 in its right portion and two illuminators 16 in its left portion. The main base 141 receives the illuminometer 17 on the center position C rightward from the opening 143. A sound collector 20 is located adjacent to (on the left of) the illuminometer 17 with respect to the opening 143. The sound collector 20 includes a microphone for collecting sounds around the imaging device 10. The top plate 122 of the front case 120 has multiple openings (sound collecting openings) 201 for collecting sounds (refer to FIGS. 1A, 1*i*, and 2). The openings face the sound collector 20. Sounds around the imaging device 10 reach the sound collector 20 through at least one sound collecting opening 201. The illuminometer 17 receives light from the surrounding environment traveling through the sound collecting openings 201. In other words, the illuminometer 17 is located below at least one sound collecting opening 201. A filter 170 (refer to FIG. 2) of, for example, white, is located above the illuminometer 17, or more specifically, between the illuminometer 17 and the front case 120. The filter 170 transmits light from the environment surrounding the imaging device 10, allowing the light to reach the illuminometer 17, and reduces dust or other matter entering through the sound collecting openings 201 into the imaging device 10.

The main base 141 includes a substantially rectangular contact member 146 on the left end of its upper surface. The contact member 146 has an upper surface in contact with the lower surface of the blade 13 (described later).

Actuator 15

Figure 4A:
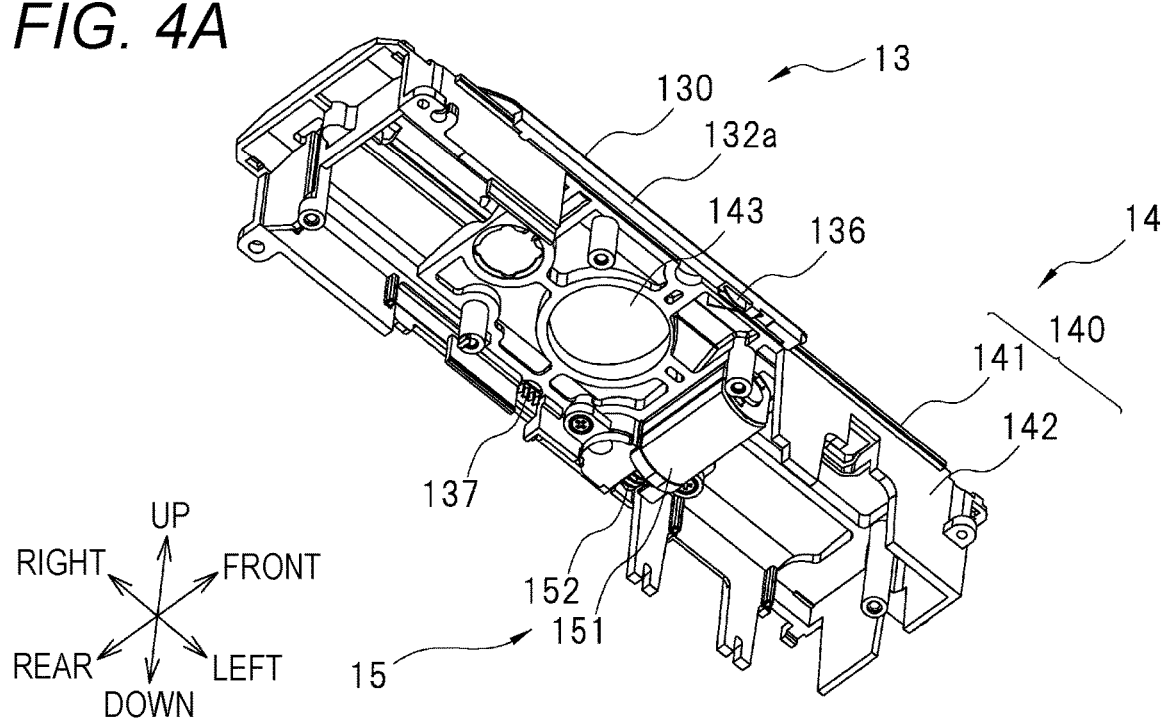
FIG. 4A is a perspective view of a blade, a base, and an actuator in the imaging device as viewed from below.

FIG. 4A is a perspective view of the blade 13, the base 140, and the actuator 15 with the blade 13 at the closed position, as viewed from below. The actuator 15 is mounted on (the lower surface of) the main base 141 to be adjacent to the rear case 121. In other words, the actuator 15 is accommodated in the base 140. In other words, the actuator 15 is located adjacent to the imaging element 110 with respect to the blade 13.

The actuator 15 functions as a drive to move the blade 13 in the first direction as described in detail later. The actuator 15 includes a motor 151, a rotational shaft 152, and a gear 153. The motor 151 includes, for example, components such as a coil, a yoke, and a magnet, and rotates with electric power (current) supplied from the power supply 24 in response to control performed by the controller 31. The motor 151 reverses the rotation direction in response to the direction of a current supplied to the coil. For example, a current flowing in one direction in the coil causes the motor 151 to rotate clockwise, and a current flowing in the opposite direction causes the motor 151 to rotate counterclockwise.

The rotational shaft 152 extends in the second direction and is engaged with the gear 153. The rotational shaft 152 is driven to rotate as the motor 151 rotates. The gear 153 engaged with the rotational shaft 152 rotates as the rotational shaft 152 is driven to rotate. As described above, the motor 151 reverses the rotation direction in response to the direction of a supplied current. The rotational shaft 152 and the gear 153 thus reverse their rotation directions in response to the direction of a current supplied to the motor 151 in the same manner. The gear 153 is engaged with a rack 137 located in the blade 13 (described later).

Blade 13

The blade 13 will be described with reference to a perspective view of an inner (lower) portion of the blade 13 in FIG. 4B. The blade 13 is formed from, for example, a synthetic resin or a metal material. The blade 13 is supported in a linearly movable manner (slidably) on the main base 141 of the base 140. With the main base 141 above the lens 111, the blade 13 is located between the first opening 125 in the housing 12 and the lens 111 in the camera module 11. The blade 13 includes a light-shielding surface 130, a guide 131 at the front of the light-shielding surface 130, and a guide 132 at the rear of the light-shielding surface 130.

Light-Shielding Surface 130

The light-shielding surface 130 is a thin plate with its longitudinal direction being the first direction. The light-shielding surface 130 is located above the base 140 and overlaps the base 140. More specifically, the light-shielding surface 130 overlaps the main base 141 and partially covers the main base 141. As described above, the main base 141 is curved and protrudes most outward at the center position C in the front-rear direction (second direction). The light-shielding surface 130 located above the main base 141 is curved along or substantially along the main base 141, and thus is curved and protrudes most outward at the center position C in the second direction. In other words, the light-shielding surface 130 is curved along or substantially along the curved profile of the lens 111 in the second direction (refer to FIG. 3). The light-shielding surface 130 in the second direction may not be curved along or substantially along the curved profile of the lens 111, and may be curved to allow the moving blade 13 to avoid colliding with the lens 111 as described later. In other word, the light-shielding surface 130 in the second direction may be shaped along the curved profile of the lens 111.

The light-shielding surface 130 has a second opening 133 vertically extending through the light-shielding surface 130. In other words, the second opening 133 is a through-hole in the light-shielding surface 130. When the blade 13 is at the second position, the second opening 133 allows subject light traveling through the first opening 125 in the top plate 122 to travel through. The second opening 133 is defined by a first open area 133a and a second open area 133b. The first open area 133a is defined between two first side wall surfaces 130a and 130b that face each other and extend leftward in the first direction from the right end of the light-shielding surface 130. The length (width) of the first open area 133a in the second direction (front-rear direction), or in other words, the distance between the first side wall surfaces 130a and 130b, is greater than the length (width) of the illuminometer 17 and the sound collector 20 in the second direction.

The second open area 133b is circular or substantially circular. When the imaging device 10 is in the open state, or in other words, the blade 13 is at the open position, the optical axis L of the lens 111 extends through the center of the second open area 133b. More specifically, the second open area 133b is an area surrounded by an arc-shaped second side wall surface 130c connected to the left ends of the first side wall surfaces 130a and 130b. The second open area 133b has the same or substantially the same outer diameter as the first opening 125 in the top plate 122 of the front case 120.

The second opening 133 shaped as described above thus defines, at one (front) side and the other (rear) side of the second opening 133 in the light-shielding surface 130, extensions 130d and 130e extending rightward in the first direction along the profile of the second open area 133b.

Guides 131 and 132

Figure 4B:
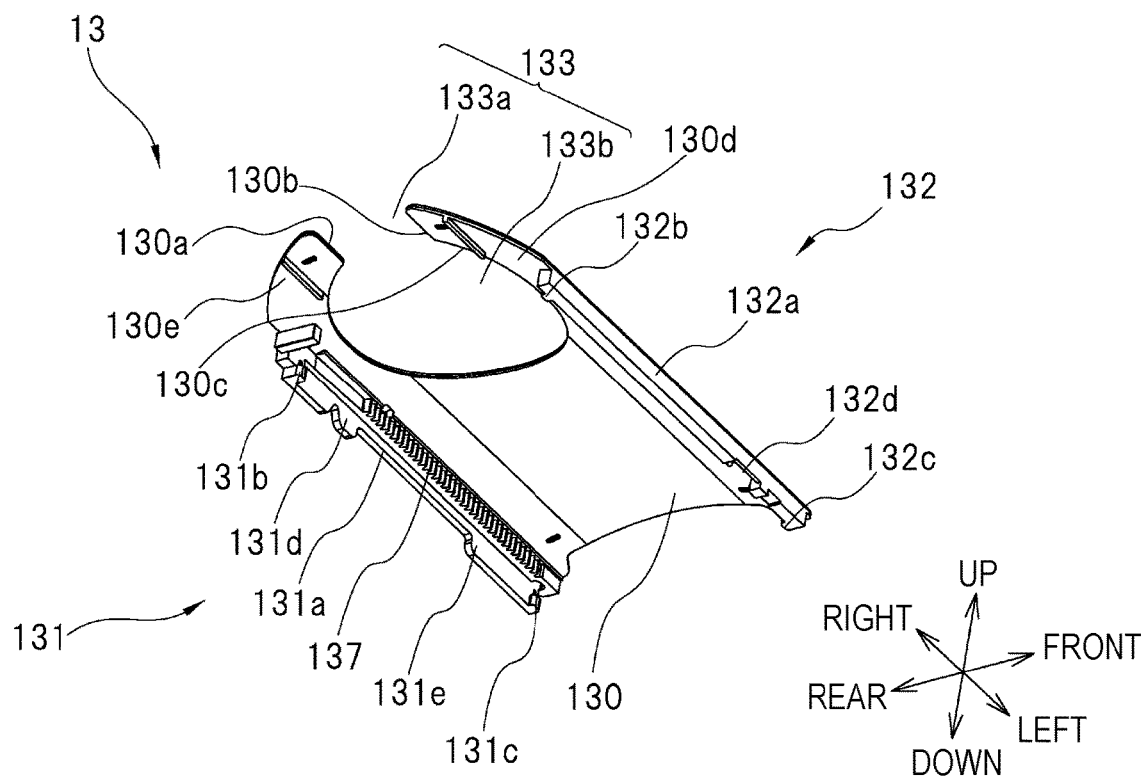
FIG. 4B is a perspective view of a shutter in the imaging device.

As shown in FIG. 4B, the guide 131 includes a guide side 131a and contact portions 131b and 131c. The guide side 131a extends downward (toward the rear case 121) from the rear of the lower surface of the light-shielding surface 130. The guide side 131a extends in the first direction being the longitudinal direction of the light-shielding surface 130. The contact portions 131b and 131c are located at the lower right end and the lower left end of the guide side 131a. The contact portions 131b and 131c are flanges extending from the guide side 131a to face frontward. The contact portions 131b and 131 have flat upper portions.

The guide side 131a is cut out in its middle portion, defining a first portion 131d on the right and a second portion 131e on the left of the lower end of the guide side 131a. In other words, the lower ends of the first portion 131d and the second portion 131e protrude more downward than the middle portion of the guide side 131a.

The guide 132 includes a guide side 132a and contact portions 132b and 132c. The guide side 132a extends downward (toward the rear case 121) from the front of the lower surface of the light-shielding surface 130. The guide side 132a extends in the first direction being the longitudinal direction of the light-shielding surface 130. The contact portions 132b and 132c are located at the lower right and the lower left end of the guide side 132a. The contact portions 132b and 132c are flanges extending from the guide side 132a to face rearward. The contact portions 132b and 132c have flat upper portions.

The inner surface of the guide side 131a faces the rear surface of the main base 141. The inner surface of the guide side 132a faces the front surface of the main base 141. In other words, the guide sides 131a and 132a hold the main base 141 between them in the second direction. This restricts the movement of the blade 13 in the second direction relative to the base 140. In other words, the movement of the blade 13 is restricted in the first direction.

The contact portions 131b, 131c, 132b, and 132c and the light-shielding surface 130 define a space in the vertical direction. The space receives the front and rear ends of the main base 141 of the base 140. More specifically, the upper surfaces of the contact portions 131b 131c, 132b, and 132c are in contact with the lower surface of the main base 141. In other words, the main base 141 is held by the upper surfaces of the contact portions 131b 131c, 132b, and 132c and the lower surface of the light-shielding surface 130. The blade 13 is thus restricted from moving in the vertical direction relative to the base 140. During assembly, the left front end and the left rear end of the main base 141 are placed into the space described above, and the blade 13 is slid in the first direction. This allows the arrangement described above.

The guide side 132a has a recess 132d in its left portion. The recess 132d receives an elastic member 136 (refer to FIGS. 2 and 4A). The elastic member 136 is, for example, a leaf spring. The elastic member 136 includes one side (facing the side wall plate 123a) in contact with the guide side 132a and the other side (facing the side wall plate 123b) in contact with a side surface of the main base 141 facing the side wall plate 123a. The guide side 132a is urged toward the side wall plate 123a by the elastic member 136. When the blade 13 receives a force in the second direction, an elastic force from the elastic member 136 restricts the movement of the blade 13 in the second direction relative to the base 140, thus reducing rattling in the second direction.

The light-shielding surface 130 has a lower surface in contact with the upper surface of the contact member 146 on the main base 141 described above. As described above, the contact member 146 is located at the left end of the upper surface of the main base 141. The contact member 146 supports the light-shielding surface 130 of the blade 13 from below at the open position. This reduces rattling of, for example, the blade 13 with its right portion moving vertically on the main base 141.

Movement of Blade 13

The light-shielding surface 130 includes the rack 137 on the lower surface of its rear, or in other words, near the upper end of the guide side 131a. In other words, the blade 13 includes the rack 137 on its portion adjacent to the imaging element 110. The rack 137 is a component with multiple teeth arranged in the right-left direction (first direction) and is engaged with the gear 153 in the actuator 15 described above. The rack 137 is a converter that converts a rotational force to a force for linear movement in the first direction when the gear 153 is driven in response to the rotation of the motor 151 controlled as described above by the controller 31. The blade 13 thus receives a force for movement in the first direction, and moves in the first direction along the guide sides 131a and 132a extending in the first direction. In other words, the blade 13 is movable (slidable) in the first direction between the base 140 (the main base 141) and the front case 120 (the top plate 122). In other words, the blade 13 can move in the first direction, but cannot move in any other directions nor rotate.

Figure 5A:
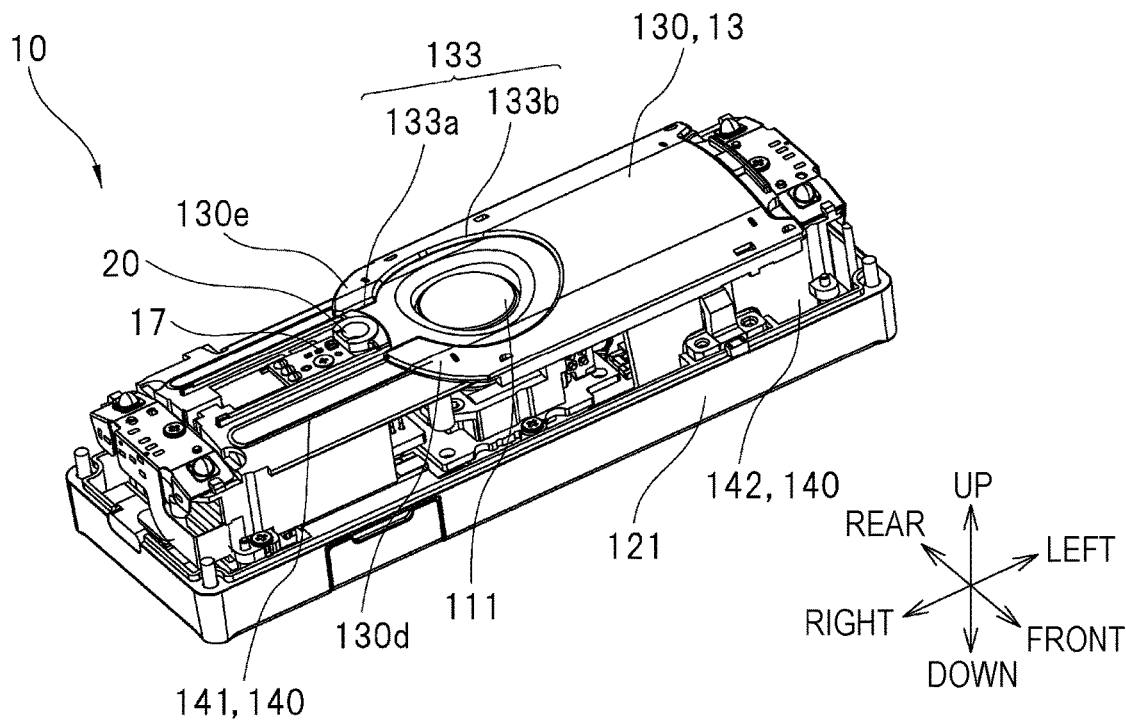
FIG. 5A is an internal perspective view of the imaging device in the open state.
Figure 5B:
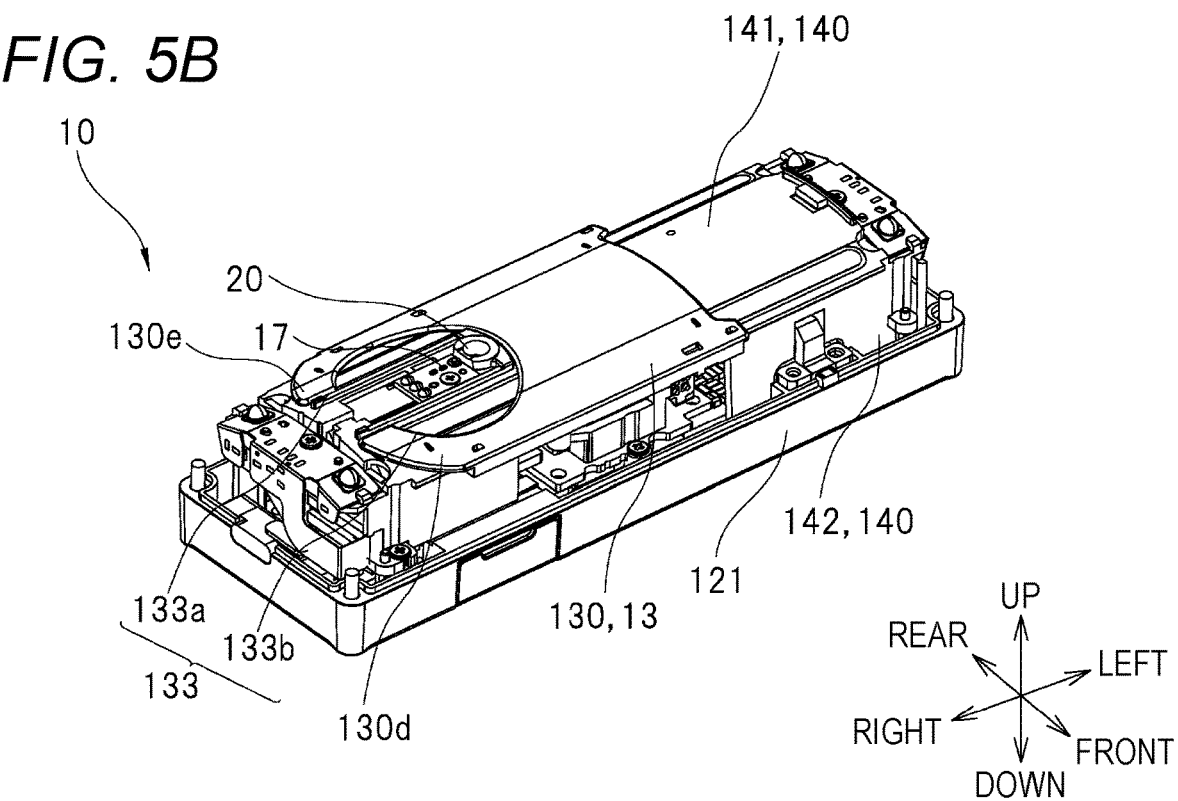
FIG. 5B is an internal perspective view of the imaging device in the closed state.

FIG. 5A is an internal perspective view of the imaging device 10 in the open state as in FIG. 1A without the front case 120. FIG. 5B is an internal perspective view of the imaging device 10 in the closed state as in FIG. 1B without the front case 120.

As shown in FIG. 5A, the blade 13 is movable leftward to a position at which the first opening 125 is open. More specifically, the blade 13 is movable to a position at which the center of the second open area 133b of the second opening 133 in the blade 13 aligns or substantially aligns with the center of the first opening 125 in the top plate 122. This exposes the lens 111 as shown in FIG. 1A. As described above, the opening 143 in the main base 141 of the base 140 has an outer diameter larger than the outer diameter of the lens 111 and smaller than the outer diameter of the first opening 125 in the front case 120. Thus, the main base 141 is also partially exposed (refer to FIG. 1A) after the blade 13 moves to the open position. With the partially exposed main base 141 and the second side wall surface 130c of the second open area 133b of the light-shielding surface 130 between the main base 141 and the top plate 122, the imaging device 10 is disconnected from outside. This structure reduces dust or other matter entering through the first opening 125 into the housing 12.

As shown in FIG. 5A, when the blade 13 is at the open position, the sound collector 20 is partially located in the first open area 133a of the second opening 133, and the other portion of the sound collector 20 and the illuminometer 17 are located rightward from the light-shielding surface 130 of the blade 13. In other words, the illuminometer 17 and the sound collector 20 are not covered with the light-shielding surface 130.

As shown in FIG. 5B, the blade 13 is movable rightward to a position at which the first opening 125 is fully closed. In other words, the blade 13 is movable to a position at which the left end of the second open area 133b of the second opening 133 in the blade 13 is located rightward from the right end of the first opening 125. At this position, the illuminometer 17 and the sound collector 20 are in the second open area 133b of the second opening 133.

When the blade 13 moves between the open position and the closed position, the first open area 133a of the second opening 133 described above passes over positions to receive the illuminometer 17 and the sound collector 20. In other words, the illuminometer 17 and the sound collector 20 are not covered with the light-shielding surface 130. Thus, the illuminometer 17 and the sound collector 20 are not covered with the blade 13 independently of whether the blade 13 is at the open or closed position or is moving between the open position and the closed position. Thus, the illuminometer 17 maintains, independently of the position of the blade 13, its function to detect the brightness of the surrounding environment, and the sound collector 20 maintains, independently of the position of the blade 13, its function to collect the surrounding sounds.

The imaging device 10 includes a position sensor 138 that functions as a detector for detecting the position of the blade 13 movable in the first direction as described above. As shown in FIG. 3, the position sensor 138 is located in a rear portion of the housing 12 and inward from the blade 13 (or in other words, adjacent to the imaging element 110). The position sensor 138 includes a contact portion 138a being a rod extending vertically. The contact portion 138a comes in contact with the guide 131 as the blade 13 moves and tilts rightward or leftward. More specifically, when the blade 13 moves from the closed position (right) to the open position (left), the contact portion 138a comes in contact with the left side surface of the first portion 131d of the guide side 131a and tilts leftward. The contact portion 138a then comes in contact with an internal first switch, and the position sensor 138 outputs a signal indicating that the blade 13 is at the open position to the controller 31.

When the blade 13 moves from the open position (left) to the closed position (right), the contact portion 138a comes in contact with the right side surface of the second portion 131e of the guide side 131a and tilts rightward. The contact portion 138a then comes in contact with an internal second switch, and the position sensor 138 outputs a signal indicating that the blade 13 is at the closed position to the controller 31.

In response to the signal output from the first switch, the controller 31 detects the blade 13 at the open position. In response to the signal output from the second switch, the controller 31 detects the blade 13 at the closed position.

The structure according to the first embodiment described above produces at least one of the advantageous effects described below.

(1) The light-shielding surface 130 of the blade 13 is curved along the curved profile of the lens 111 in the front-rear direction (second direction). This structure is less likely to include an extra space between the lens 111 and the blade 13, and can downsize the imaging device 10.

(2) The actuator 15 is adjacent to the imaging element 110 with respect to the blade 13. In other words, the actuator 15 can be located inside a space partitioned with the blade 13. This structure can downsize the imaging device 10 as compared with a structure with an actuator 15 external to the blade 13.

(3) The rack 137 is located on a portion of the blade 13 adjacent to the imaging element 110, and is engaged with the actuator 15 to convert the rotational driving force generated by the actuator 15 to a force for movement in the right-left direction (first direction). Thus, a member for moving the blade 13 in the first direction can be located inside a space partitioned with the blade 13. This structure can downsize the imaging device 10 as compared with a structure with a rack 137 external to the blade 13.

(4) The position sensor 138 is located adjacent to the imaging element 110 with respect to the blade 13. Thus, the sensor for detecting the position of the blade 13 can be located inside a space partitioned with the blade 13. This structure can downsize the imaging device 10 in the front-rear direction (second direction) as compared with a structure with a rack 137 external to the blade 13.

(5) The elastic member 136 is located between the blade 13 and the base 140. Thus, when the blade 13 receives a force in the front-rear direction (second direction), an elastic force from the elastic member 136 restricts the movement of the blade 13 in the second direction relative to the base 140. This reduces rattling in the second direction.

(6) The blade 13 includes the light-shielding surface 130 with the second opening 133. The second opening 133 allows subject light traveling through the first opening 125 in the top plate 122 to travel through when the blade 13 is at the second position. The second opening 133 includes the first open area 133a and the second open area 133b. The first open area 133a is between the two first side wall surfaces 130a and 130b facing each other and extending from one (right) end to the other (left) end of the light-shielding surface 130 in the first direction (right-left direction). The second open area 133b is surrounded by the arc-shaped second side wall surface 130c connected to the (left) ends of the two first side wall surfaces 130a and 130b in the first direction (right-left direction). With the second opening 133 having the above shape, the illuminometer 17 and the sound collector 20 are not covered with the blade 13 independently of whether the blade 13 is at the open or closed position or is moving between the open position and the closed position. Thus, the illuminometer 17 maintains, independently of the position of the blade 13, its function to detect the brightness of the surrounding environment, and the sound collector 20 maintains, independently of the position of the blade 13, its function to collect the surrounding sounds.

Second Embodiment

An imaging device according to a second embodiment will be described below. In the example described below, the same reference numerals denote the same components as in the first embodiment, and the second embodiment will be described focusing on the differences from the first embodiment. The components that are not particularly described are the same as the corresponding components in the first embodiment. The imaging device according to the second embodiment differs from the imaging device 10 according to the first embodiment in that the imaging element can receive subject light when the blade is at the closed position.

Figure 6A:
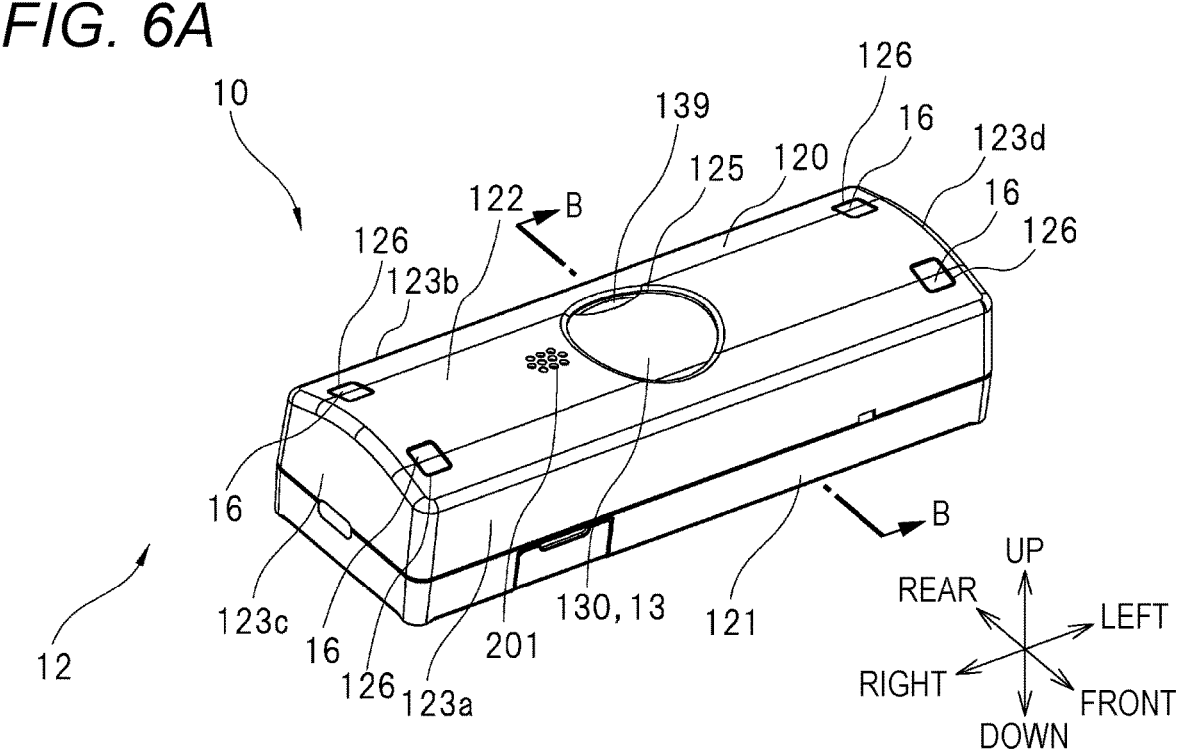
FIG. 6A is an external view of an imaging device according to a second embodiment in a closed state.
Figure 6B:
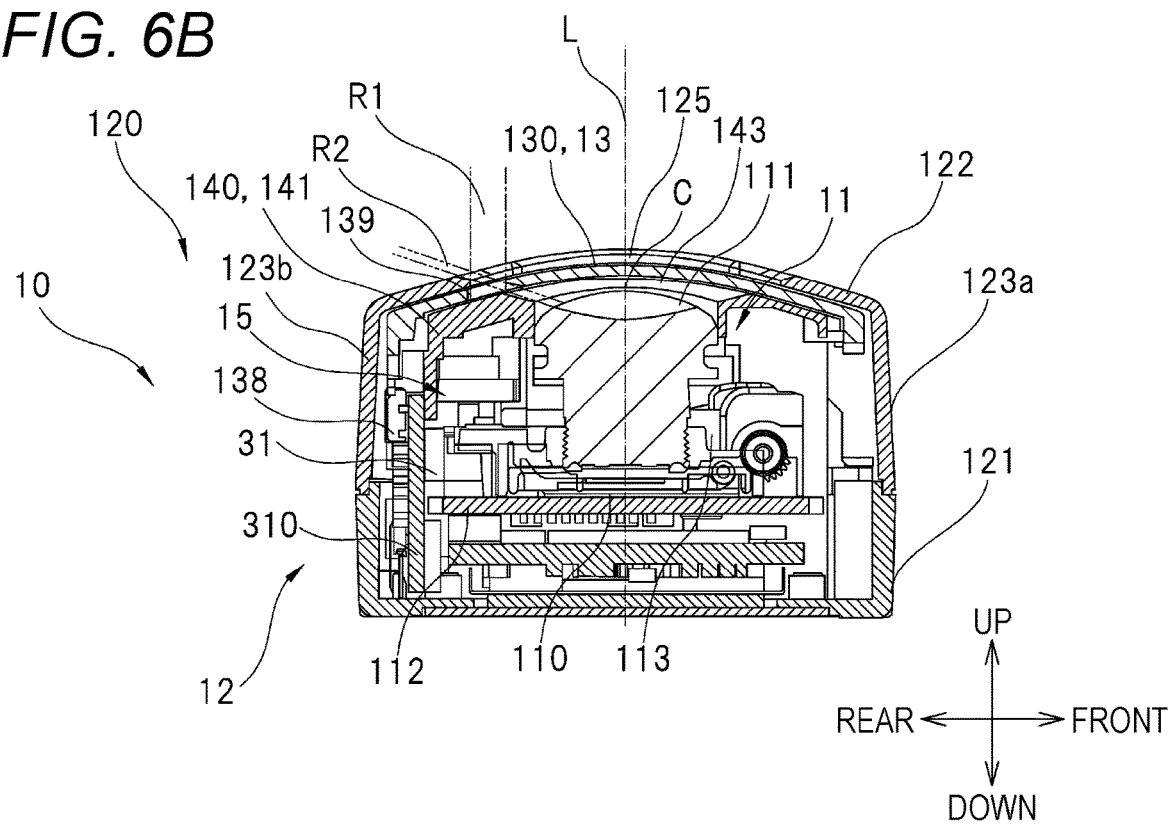
FIG. 6B is a cross-sectional view of the imaging device taken along line B-B in FIG. 6A.

FIG. 6A is an external view of the imaging device 10 according to the second embodiment. FIG. 6B is a cross-sectional view of the imaging device 10 taken along line B-B in FIG. 6A. FIGS. 6A and 6B show the imaging device 10 in the closed state. The imaging device 10 according to the second embodiment has an angle of view of 180° or greater in the front-rear direction. In other words, the lens 111 has a field of view ranging greater than 180° in the front-rear direction.

The light-shielding surface 130 of the blade 13 has an auxiliary opening 139 that is a through-hole connecting the inside and the outside of the light-shielding surface 130. The auxiliary opening 139 is arc-shaped in the light-shielding surface 130. The light-shielding surface 130 has the auxiliary opening 139 rearward from the center position C. More specifically, when the blade 13 is at the closed position (first position), the auxiliary opening 139 overlaps an area near the rear end of the first opening 125 in the top plate 122 of the front case 120 in the vertical direction parallel to the optical axis L. In other words, although the imaging device 10 is in the closed state, the blade 13 does not block light from the area near the rear end of the first opening 125. Thus, some light beams of the subject light traveling through the area near the rear end of the first opening 125 travel through the auxiliary opening 139. In other words, the auxiliary opening 139 allows subject light to travel through when the blade 13 is at the first position.

The auxiliary opening 139 vertically overlaps the main base 141 in the base 140 in the blade driver 14. As shown in FIG. 6B, the main base 141 blocks subject light traveling within a region R1 located rearward after the subject light travels through the first opening 125 and the auxiliary opening 139. Thus, no light beam of subject light in the region R1, or in other words, neither the light beam of subject light traveling parallel to the optical axis L nor the light beam of subject light traveling in a direction at a small angle with respect to the optical axis L, travels through the lens 111 or reaches the imaging element 110.

With the auxiliary opening 139 vertically overlapping the main base 141, the lens 111 is unviewable through the auxiliary opening 139 to a user viewing the imaging device 10 in a direction of the optical axis. The light-shielding surface 130 of the blade 13 may have a color similar to the color of an area of the main base 141 being a support that overlaps the auxiliary opening 139 in the vertical direction parallel to the optical axis L. The auxiliary opening 139 in the light-shielding surface 130 is thus less viewable to a viewer.

In contrast, the main base 141 does not block subject light traveling within the range of a region R2 located rearward after the light travels through the first opening 125 and the auxiliary opening 139. The region R2 may be a range from an end of the angle of view to, for example, 20 to 30°, with reference to the angle of view of 180° of the imaging device 10. Thus, the light beam of subject light within the region R2, or in other words, the light beam of subject light traveling in a direction at a larger angle with respect to the optical axis L travels through the lens 111 and reaches the imaging element 110. In other words, the auxiliary opening 139 is shaped along the outer edge of the range in which subject light traveling within the region R2 can travel through. The imaging element 110 can thus partially image the field of view of the lens 111 although the imaging device 10 is in the closed state.

The controller 31 detects changes in the environment in which the imaging device 10 is installed based on signals (image signals) output from the imaging element 110 when the imaging device 10 is in the closed state. When generating an image based on input image signals, for example, the controller 31 can detect, for example, an increase in the number of people in a room in which the imaging device 10 is installed or can detect a moving object in the imaging range as changes in the environment. When detecting changes in the amount of light (brightness) based on input image signals, the controller 31 can detect, for example, whether the light is turned on in a room in which the imaging device 10 is installed as changes in the environment.

When the imaging device 10 is in the closed state, the controller 31 detecting changes in the environment moves the blade 13 leftward to change the imaging device 10 to the open state. More specifically, the controller 31 controls the direction of a current supplied to a coil in the actuator 15 to rotate the motor 151. The rotation of the motor 151 generates a driving force, which is transmitted to the light-shielding surface 130 through the gear 153 to move the light-shielding surface 130 leftward in the right-left direction. The center of the first opening 125 in the top plate 122 then aligns with or substantially aligns with the center of the second open area 133b of the second opening 133 in the light-shielding surface 130. In other words, the imaging device 10 is changed to the open state shown in FIG. 1A.

The auxiliary opening 139 may not be located rearward in the light-shielding surface 130, or in other words, at the rear of the first opening 125 in the top plate 122. The auxiliary opening 139 may be located at the front, right, or left of the first opening 125. In other words, the auxiliary opening 139 may be located at the front, rear, right, or left of the first opening 125 depending on, for example, the environment in which the imaging device 10 is installed or the orientation of the installed imaging device 10.

The second embodiment described above produces the advantageous effects described below, in addition to the advantageous effects described in the first embodiment.

(7) When the blade 13 being a light shield is at the closed position being the first position, subject light can travel through the auxiliary opening 139. The auxiliary opening 139 is located in a part of the light-shielding surface 130 of the blade 13 being a light shield. Thus, the imaging device 10 can detect changes in the environment based on the image signals generated by the imaging element 110 in the closed state and switch from the closed state to the open state in response to the changes in the environment outside the imaging device 10. This can eliminate, for example, a sensor for detecting changes in the environment outside the imaging device 10 or an external device for externally causing the blade 13 to move. The structure and operation control of the imaging device 10 are thus simpler, reducing the manufacturing cost of the imaging device 10.

(8) The auxiliary opening 139 overlaps an area in the first opening 125 in the vertical direction parallel to the optical axis L when the blade 13 is at the closed position being the first position. The imaging device 10 in the closed state can thus capture an image of a part of a capturable range. This eliminates devices for detecting changes in the environment outside the imaging device 10, and can reduce the manufacturing cost.

(9) The lens 111 being an optical member has a viewing range of 180° or greater in the front-rear direction. The auxiliary opening 139 is located to allow subject light traveling within the region R2 being a predetermined angular range from an end of the viewing range of the lens 111 to travel through the auxiliary opening 139. The auxiliary opening 139 can thus be located at a position less viewable from a user viewing the imaging device 10 from outside.

(10) The main base 141 being a support includes an area overlapping the auxiliary opening 139 in the vertical direction parallel to the optical axis L. The overlapping area has a color similar to the color of the blade 13 being a light shield. The auxiliary opening 139 is thus less viewable from outside the imaging device 10. A user does not recognize that the imaging device 10 in the closed state can still partly capture images. The user is less likely to feel discomfort.

In the structure according to the second embodiment described above, the light-shielding surface 130 has one auxiliary opening 139. The light-shielding surface 130 may have two or more auxiliary openings 139. In other words, the blade 13 being a light shield may have at least one auxiliary opening 139.

First Modification

Figure 7A:
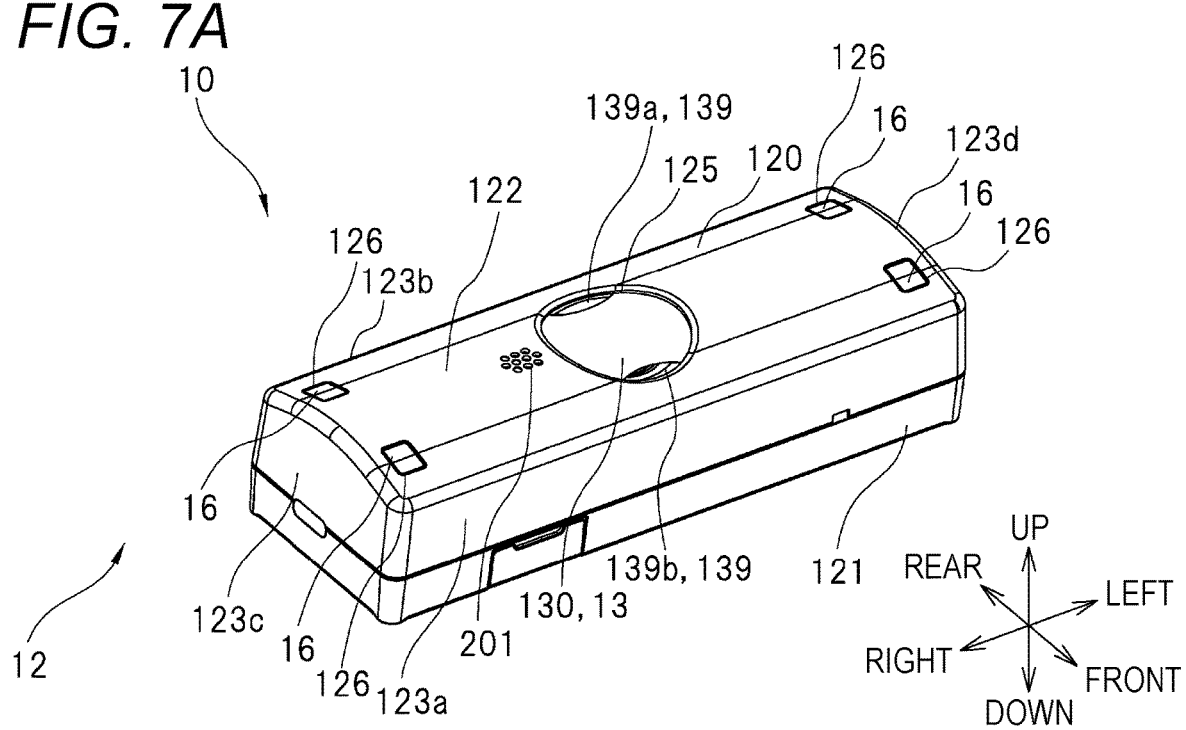
FIG. 7A is an external view of an imaging device according to a first modification in a closed state.

FIG. 7A is an external view of an imaging device 10 according to a first modification. The imaging device 10 according to the first modification has two auxiliary openings 139 in the light-shielding surface 130. FIG. 7A shows the imaging device 10 in the closed state as in FIG. 6A.

As shown in FIG. 7A, an auxiliary opening 139a is located rearward from the center position C as in the second embodiment described above (refer to FIG. 6B). In other words, the auxiliary opening 139a vertically overlaps an area near the rear end of the first opening 125 in the top plate 122. The auxiliary opening 139b is located frontward from the center position C. In other words, the auxiliary opening 139b vertically overlaps the front end of the first opening 125 in the top plate 122. Thus, the blade 13 does not block light from the areas near the front and rear ends of the first opening 125 although the imaging device 10 is in the closed state. In other words, some light beams of the subject light traveling through the areas near the front and rear ends of the first opening 125 travel through the auxiliary openings 139.

The auxiliary openings 139a and 139b are shaped point-symmetric to each other about the center position C. In other words, the auxiliary opening 139b has the same shape as the auxiliary opening 139a rotated by 180° about the center position C. The auxiliary openings 139a and 139b vertically overlap the main base 141. Thus, in the front and rear portions of the imaging device 10 in the closed state, the main base 141 blocks light beams of the subject light traveling parallel to the optical axis L and light beams of the subject light traveling in a direction at a small angle with respect to the optical axis L after the light beams travel through the auxiliary opening 139. In other words, when the imaging device 10 is in the closed state, light beams of the subject light traveling within the region R1 shown in FIG. 6B neither travel the lens 111 nor reach the imaging element 110.

In contrast, in the front and rear portions of the imaging device 10 in the closed state, the main base 141 does not block light beams of the subject light traveling in a direction at a large angle with respect to the optical axis L. In other words, when the imaging device 10 is in the closed state, light beams of the subject light traveling within the region R2 shown in FIG. 6B travel through the lens 111 and are received by the imaging element 110. Thus, the structure according to the first modification produces the same advantageous effects as in the second embodiment.

Second Modification

Figure 7B:
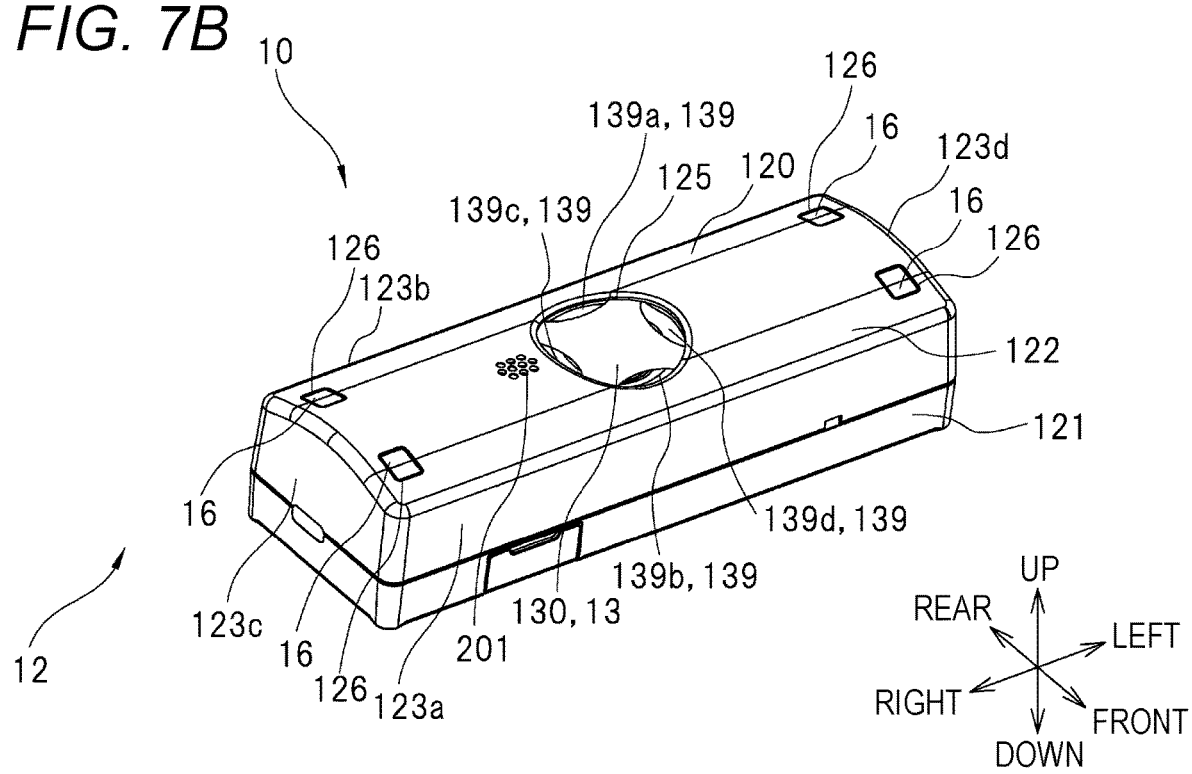
FIG. 7B is an external view of an imaging device according to a second modification in a closed state.

FIG. 7B is an external view of an imaging device 10 according to a second modification. The imaging device 10 according to the second modification has four auxiliary openings 139 in the light-shielding surface 130. FIG. 7B shows the imaging device 10 in the closed state as in FIG. 6A. As shown in FIG. 7B, the light-shielding surface 130 has auxiliary openings 139c and 139d in addition to the auxiliary openings 139a and 139b as in FIG. 7A described above. The imaging device 10 according to the second modification has an angle of view of 180° or greater in the front-rear and right-left directions. In other words, the lens 111 has a field of view ranging greater than 180° in the front-rear and right-left directions.

The auxiliary opening 139c is located rightward from the center position C (refer to FIG. 6B), or in other words, at the right of the first opening 125. The auxiliary opening 139c has the same shape as the auxiliary opening 139a rotated counterclockwise in the figure by 90° about the center position C. The auxiliary opening 139d is located leftward from the center position C, or in other words, at the left of the first opening 125. The auxiliary opening 139d has the same shape as the auxiliary opening 139a rotated clockwise in the figure by 90° about the center position C. In other words, the similarly shaped auxiliary openings 139a, 139b, 139c, and 139d are located in areas near the front, rear, right, and left ends of the first opening 125.

Thus, although the imaging device 10 is in the closed state, the blade 13 does not block light from the areas near the front, rear, right, and left ends of the first opening 125. Some light beams of the subject light traveling through the areas near the front, rear, right, and left ends of the first opening 125 then travel through the auxiliary openings 139.

The auxiliary openings 139a, 139b, 139c, and 139d vertically overlap the main base 141. Thus, in the front, rear, right, and left portions of the imaging device 10 in the closed state, the main base 141 blocks light beams of the subject light traveling parallel to the optical axis L and light beams of the subject light traveling in a direction at a small angle with respect to the optical axis L after the light beams travel through the auxiliary openings 139. In other words, when the imaging device 10 is in the closed state, light beams of the subject light traveling within the region R1 shown in FIG. 6B neither travel the lens 111 nor reach the imaging element 110.

In contrast, in the front, rear, right, and left portions of the imaging device 10 in the closed state, the main base 141 does not block light beams of the subject light traveling in a direction at a large angle with respect to the optical axis L. In other words, when the imaging device 10 is in the closed state, light beams of the subject light traveling within the region R2 shown in FIG. 6B travel through the lens 111 and are received by the imaging element 110. Thus, the structure according to the second modification produces the same advantageous effects as in the second embodiment.

Third Modification

Although the auxiliary opening 139 is located in the light-shielding surface 130 in the second embodiment, the first modification, and the second modification, the auxiliary opening 139 may not be located in a surface other than the light-shielding surface 130. For example, an auxiliary opening may be located in the top plate 122 of the front case 120.

Figure 8:
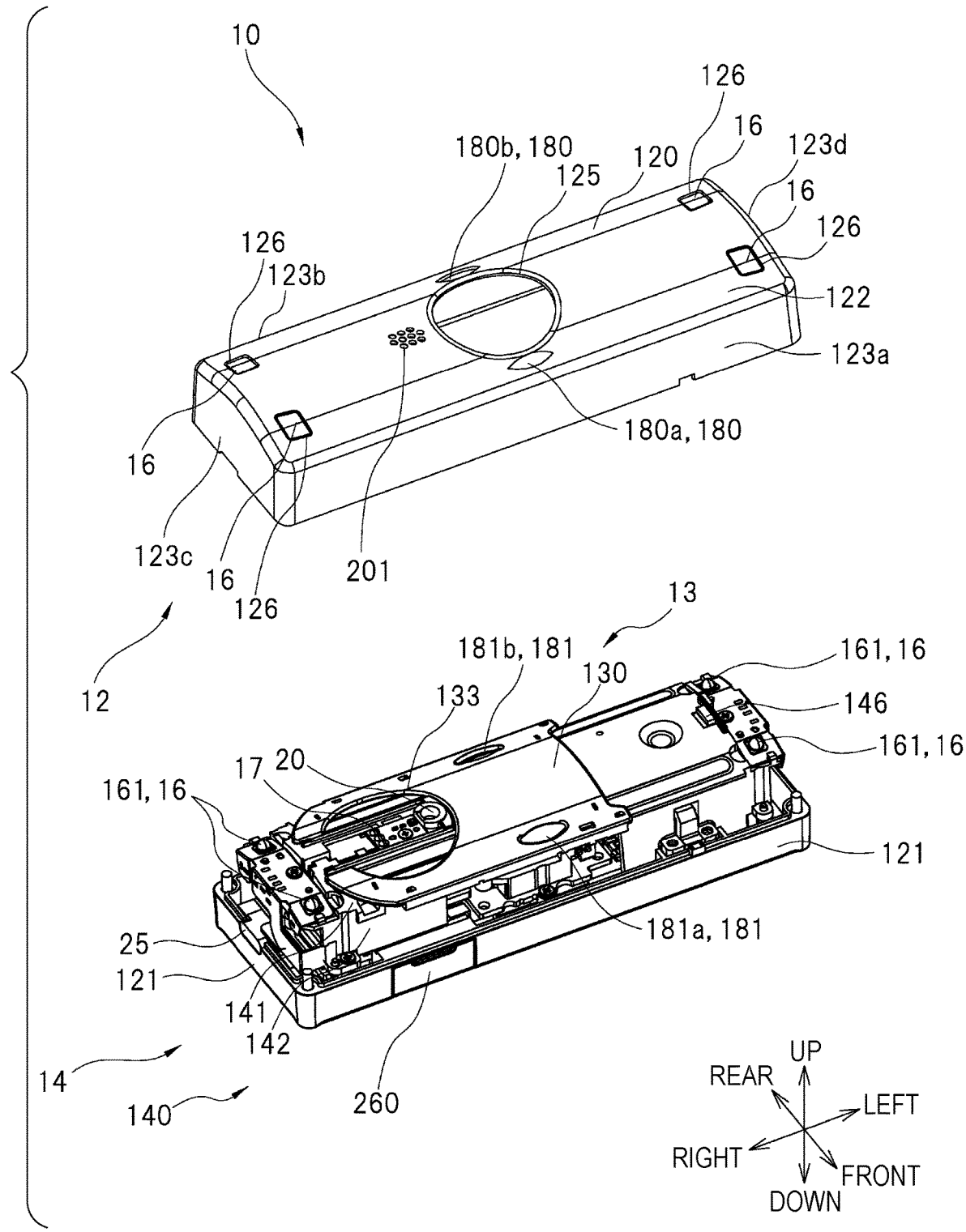
FIG. 8 is an exploded perspective view of an imaging device according to a third modification in a closed state.

FIG. 8 is an exploded perspective view of an imaging device 10 according to a third modification. The imaging device 10 according to the third modification has an angle of view of 180° or greater in the front-rear direction. In other words, the lens 111 has a field of view ranging greater than 180° in the front-rear direction.

The top plate 122 of the front case 120 has an auxiliary opening 180a frontward from the first opening 125 and an auxiliary opening 180b rearward from the first opening 125. In other words, the auxiliary openings 180a and 180b are located at positions different from the position of the first opening 125 in the top plate 122. The auxiliary openings 180a and 180b are collectively referred to as the auxiliary openings 180. Each auxiliary opening 180 is oval in the top plate 122 and connects the inside and the outside of the top plate 122. In other words, each auxiliary opening 180 is a through-hole located in the top plate 122.

The light-shielding surface 130 of the blade 13 has auxiliary openings 181a and 181b (collectively referred to as auxiliary openings 181). Each auxiliary opening 181 is oval in the light-shielding surface 130, similarly to the auxiliary opening 180 located in the top plate 122. Each auxiliary opening 181 is a through-hole connecting the inside and the outside of the light-shielding surface 130. The auxiliary openings 181 are located not to vertically overlap the first opening 125 when the blade 13 is in the closed position (first position). In other words, the auxiliary openings 181 are located at positions different from the position of the first opening 125.

More specifically, the auxiliary openings 181 are located to vertically overlap the auxiliary openings 180 in the top plate 122 when the light-shielding surface 130 blocks light from the first opening 125 (in other words, the imaging device 10 is in the closed state). In other words, the auxiliary opening 181a is located near the front end of the light-shielding surface 130 and vertically overlaps the auxiliary opening 180a in the top plate 122. The auxiliary opening 181b is located near the rear end of the light-shielding surface 130 and vertically overlaps the auxiliary opening 180b in the top plate 122. Thus, although the imaging device 10 is in the closed state, some light beams of the subject light traveling in front of and behind the first opening 125 travel through the auxiliary openings 180 and 181.

The auxiliary openings 180 vertically overlap the main base 141. Thus, in the front, rear, right, and left portions of the imaging device 10 in the closed state, the main base 141 blocks light beams of the subject light traveling parallel to the optical axis L and light beams of the subject light traveling in a direction at a small angle with respect to the optical axis L after the light beams travel through the auxiliary openings 181. In other words, when the imaging device 10 is in the closed state, light beams of the subject light traveling within the region R1 shown in FIG. 6B neither travel the lens 111 nor reach the imaging element 110.

In contrast, in the front and rear portions of the imaging device 10 in the closed state, the main base 141 does not block light beams of the subject light traveling in a direction at a large angle with respect to the optical axis L after the light beams travel through the auxiliary openings 181. In other words, when the imaging device 10 is in the closed state, light beams of the subject light traveling within the region R2 shown in FIG. 6B travel through the lens 111 and are received by the imaging element 110.

The auxiliary openings 180 and 181 may not be located frontward and rearward from the first opening 125. The auxiliary openings 180 and 181 may be located either frontward from or rearward from the first opening 125. The auxiliary openings 180 and 181 may be located leftward, rightward, or both leftward and rightward from the first opening 125. In other words, the front case 120 being a housing may have at least one auxiliary opening 180.

In the structure according to the third modification, the top plate 122 of the front case 120 being a housing has the auxiliary openings 180. More specifically, the auxiliary openings 180 are located at positions different from the position of the first opening 125 in the top plate 122 of the housing 12. This structure produces the same advantageous effects as in the second embodiment.

In the third modification described above, the top plate 122 of the housing 12 and the light-shielding surface 130 of the blade 13 are each curved along or substantially along the curved profile of the lens 111 in the front-rear direction. However, the top plate 122 and the light-shielding surface 130 may not be curved. In this case, the auxiliary openings 180 may be located not in the top plate 122 of the housing 12 but in at least one of the side wall plates 123a, 123b, 123c, and 123d.

Although various embodiments and modifications are described above, the present invention is not limited to the embodiments and the modifications. Other forms implementable within the scope of technical idea of the present invention fall within the scope of the present invention.

The auxiliary openings 139 in the second embodiment, the first modification, and the second modification may not be arc-shaped, and may have other shapes including a circle, an oval, and a polygon. The auxiliary openings 180 and 181 in the third modification may not be oval, and may have other shapes including a circle and a polygon.

The auxiliary openings 139 in the second embodiment, the first modification, and the second modification may be one or more pinholes with small diameters. In this case, the auxiliary opening 139 may not be located within the range of the region R2 described above, and may be located in any part within a range of the light-shielding surface 130 that vertically overlaps the first opening 125 when the blade 13 is at the closed position. The auxiliary opening 139 may be annular along the inner circumference of the first opening 125. In this case, the light-shielding surface 130 may include a connector for connecting parts of the light-shielding surface 130 inside and outside the annular auxiliary opening 139.

The technique according to one or more embodiments may provide the structure described below.

(1) An imaging device, comprising:
    an imaging element configured to receive subject light;
    an optical member configured to guide the subject light traveling through a first opening in a housing to the imaging element;
    a light shield between the first opening and the optical member, the light shield being configured to restrict the subject light from entering the imaging element; and
    a drive configured to move the light shield in a first direction intersecting with an optical axis of the optical member to position the light shield at one of a first position at which the subject light is restricted from entering the image element or a second position at which the subject light is allowed to enter the imaging element,
    wherein the light shield is curved along a curved profile of the optical member in a second direction intersecting with the optical axis and with the first direction.

(2) The imaging device according to (1), wherein the drive is adjacent to the imaging element with respect to the light shield.

(3) The imaging device according to (1) or (2), further comprising:
    a converter on a portion of the light shield adjacent to the imaging element, the converter being engaged with the drive to convert a driving force generated by the drive to a force for movement in the first direction.

(4) The imaging device according to any one of (1) to (3), further comprising:
    a detector adjacent to the imaging element with respect to the light shield, the detector being configured to detect a position of the light shield moved in the first direction by the drive.

(5) The imaging device according to any one of (1) to (4), further comprising:
    a support supporting the light shield from a position adjacent to the imaging element; and
    an elastic member between the light shield and the support.

(6) The imaging device according to any one of (1) to (5), wherein
    the light shield has a second opening to allow the subject light traveling through the first opening to travel through at the second position, the second opening includes a first open area and a second open area,
    the first open area is between two first side wall surfaces facing each other and extending from a first end of the light shield in the first direction toward a second end of the light shield in the first direction, and
    the second open area is surrounded by an arc-shaped second side wall surface connected to ends of the two first side wall surfaces closer to the second end of the light shield in the first direction.

(7) The imaging device according to any one of (1) to (6), further comprising:
an auxiliary opening to allow the subject light to travel through when the light shield is at the first position.

(8) An imaging device, comprising:
an imaging element configured to receive subject light;
an optical member configured to guide the subject light traveling through a first opening in a housing to the imaging element;
a light shield between the first opening and the optical member, the light shield being configured to restrict the subject light from entering the imaging element;
a drive configured to move the light shield in a first direction intersecting with an optical axis of the optical member to position the light shield at one of a first position at which the subject light is restricted from entering the image element or a second position at which the subject light is allowed to enter the imaging element; and
an auxiliary opening configured to allow the subject light to travel through when the light shield is at the first position.

(9) The imaging device according to (8), wherein
a part of the light shield has at least one auxiliary opening being the auxiliary opening.

(10) The imaging device according to (8) or (9), wherein
the at least one auxiliary opening overlaps an area in the first opening in a direction parallel to the optical axis when the light shield is at the first position.

(11) The imaging device according to (8), wherein
the housing has at least one auxiliary opening being the auxiliary opening.

(12) The imaging device according to any one of (8) to (11), wherein
the optical member has a viewing range of 180° or greater, and
the at least one auxiliary opening is located to allow the subject light traveling within a predetermined angular range from an end of the viewing range of the optical member to travel through the at least one auxiliary opening.

(13) The imaging device according to any one of (8) to (10) and (12), further comprising:
a support supporting the light shield,
wherein an area of the support overlapping the auxiliary opening in a direction parallel to the optical axis has a color similar to a color of the light shield.

(14) The imaging device according to any one of (8) to (13), wherein
the light shield is curved along a curved profile of the optical member in a second direction intersecting with the optical axis and with the first direction.

What is claimed is:

1. An imaging device, comprising:
an imaging element configured to receive subject light;
an optical member configured to guide the subject light traveling through a first opening in a housing to the imaging element;
a light shield between the first opening and the optical member, the light shield being configured to restrict the subject light from entering the imaging element; and
a drive configured to move the light shield in a first direction intersecting with an optical axis of the optical member to position the light shield at one of a first position at which the subject light is restricted from entering the image element or a second position at which the subject light is allowed to enter the imaging element,
wherein the light shield is curved along a curved profile of the optical member in a second direction intersecting with the optical axis and with the first direction, and
the light shield comprises:
a second opening for allowing the subject light to the optical member in the second position, and
a guide for restricting movement of the light shield to the first direction, wherein the guide comprises an abutting part adjacent to the second opening in the second direction.

2. The imaging device according to claim 1, wherein the drive is adjacent to the imaging element with respect to the light shield.

3. The imaging device according to claim 2, further comprising:
a converter on a portion of the light shield adjacent to the imaging element, the converter being engaged with the drive to convert a driving force generated by the drive to a force for movement in the first direction.

4. The imaging device according to claim 1, further comprising:
a detector adjacent to the imaging element with respect to the light shield, the detector being configured to detect a position of the light shield moved in the first direction by the drive.

5. The imaging device according to claim 1, further comprising:
a support supporting the light shield from a position adjacent to the imaging element; and an elastic member between the light shield and the support.

6. The imaging device according to claim 1, wherein
the second opening includes a first open area and a second open area,
the first open area is between two first side wall surfaces facing each other and extending from a first end of the light shield in the first direction toward a second end of the light shield in the first direction, and
the second open area is surrounded by an arc-shaped second side wall surface connected to ends of the two first side wall surfaces closer to the second end of the light shield in the first direction.

7. The imaging device according to claim 1, further comprising:
an auxiliary opening to allow the subject light to travel through when the light shield is at the first position.

8. An imaging device, comprising:
an imaging element configured to receive subject light;
an optical member configured to guide the subject light traveling through a first opening in a housing to the imaging element;
a light shield between the first opening and the optical member, the light shield being configured to restrict the subject light from entering the imaging element;
a drive configured to move the light shield in a first direction intersecting with an optical axis of the optical member to position the light shield at one of a first position at which the subject light is restricted from entering the image element or a second position at which the subject light is allowed to enter the imaging element, wherein the drive comprises a base member offset from the optical member; and
an auxiliary opening configured to allow the subject light to travel through when the light shield is at the first position, wherein the auxiliary opening partially overlaps the base member in a vertical direction with respect to the base member when the light shield is in the first position.

9. The imaging device according to claim 8, wherein a part of the light shield has at least one auxiliary opening being the auxiliary opening.

10. The imaging device according to claim 9, wherein the at least one auxiliary opening overlaps an area in the first opening in a direction parallel to the optical axis when the light shield is at the first position.

11. The imaging device according to claim 8, wherein the housing has at least one auxiliary opening being the auxiliary opening.

12. The imaging device according to claim 11, wherein the optical member has a viewing range of 180° or greater, and
the at least one auxiliary opening is located to allow the subject light traveling within a predetermined angular range from an end of the viewing range of the optical member to travel through the at least one auxiliary opening.

13. The imaging device according to claim 8, further comprising:
a support supporting the light shield,
wherein an area of the support overlapping the auxiliary opening in a direction parallel to the optical axis has a color similar to a color of the light shield.

14. The imaging device according to claim 8, wherein the light shield is curved along a curved profile of the optical member in a second direction intersecting with the optical axis and with the first direction.

\* \* \* \* \*